(12) United States Patent
Contreras et al.

(10) Patent No.: US 8,917,465 B1
(45) Date of Patent: Dec. 23, 2014

(54) IMPLEMENTING SPIN TORQUE OSCILLATOR POWER-ON OSCILLATION CHECKER USING RAMPED STO BIAS DIFFERENTIATOR IN MICROWAVE-ASSISTED MAGNETIC RECORDING (MAMR) HARD DISK DRIVES

(71) Applicant: HGST Netherlands B.V., Amsterdam (NL)

(72) Inventors: John Contreras, Palo Alto, CA (US); Samir Y. Garzon, San Jose, CA (US); Ikuya Tagawa, Hiratsuka (JP); Rehan Ahmed Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/316,628

(22) Filed: Jun. 26, 2014

(51) Int. Cl.
*G11B 27/36* (2006.01)

(52) U.S. Cl.
USPC ................................. 360/31; 360/65

(58) Field of Classification Search
None
See application file for complete search history.

(56) References Cited

U.S. PATENT DOCUMENTS

| | | | |
|---|---|---|---|
| 7,791,829 B2 | 9/2010 | Takeo et al. | |
| 7,982,996 B2 | 7/2011 | Smith et al. | |
| 8,027,118 B2 | 9/2011 | Ezawa et al. | |
| 8,174,798 B2 | 5/2012 | Nagasawa et al. | |
| 8,233,230 B2 | 7/2012 | Yano et al. | |
| 8,238,060 B2 | 8/2012 | Yamada et al. | |
| 8,345,380 B2 | 1/2013 | Sata et al. | |
| 8,810,954 B1* | 8/2014 | Taguchi et al. | 360/75 |
| 2009/0059417 A1* | 3/2009 | Takeo et al. | 360/75 |
| 2010/0134922 A1 | 6/2010 | Yamada et al. | |
| 2010/0232053 A1* | 9/2010 | Yano et al. | 360/75 |
| 2011/0038081 A1* | 2/2011 | Contreras et al. | 360/125.03 |
| 2012/0002325 A1* | 1/2012 | Oikawa et al. | 360/110 |
| 2012/0134046 A1 | 5/2012 | Matsumoto et al. | |
| 2013/0050865 A1 | 2/2013 | Katada et al. | |
| 2013/0050869 A1 | 2/2013 | Nagasaka et al. | |
| 2013/0069626 A1 | 3/2013 | Zhou et al. | |
| 2013/0148234 A1 | 6/2013 | Morinaga et al. | |
| 2013/0229895 A1 | 9/2013 | Shiroishi et al. | |
| 2014/0063648 A1* | 3/2014 | Shiroishi et al. | 360/75 |
| 2014/0118861 A1* | 5/2014 | Funayama | 360/119.02 |

OTHER PUBLICATIONS

Sato et al., "Thin Spin-torque Oscillator With High AC-Field for High Density Microwave-Assisted Magnetic Recording" Jul. 2013 http://ieeexplore.ieee.org/xpl/articleDetails.jsp?tp=&arnumber=6559154.
Watanabe et al., "Oscillation Stability of a Small Size Spin Torque Oscillator for MAMR", Jul. 2013 http://ieeexplore.ieee.org/xpl/articleDetails.jsp?tp=&arnumber=6558956.

* cited by examiner

*Primary Examiner* — Paul Huber
(74) *Attorney, Agent, or Firm* — Joan Pennington

(57) ABSTRACT

A method, apparatus, and system are provided for implementing a power-on spin-torque oscillator (STO) oscillation checker to monitor STO resistance to identify STO oscillation with microwave assisted magnetic recording (MAMR) hard disk drives (HDDs). A changing bias current is applied to the STO in the presence of constant write drive current. The STO bias current is changed to observe sudden changes in STO resistance monitored using a differentiator circuit to identify STO oscillation, used to ensure stable MAMR HDD write operation.

20 Claims, 10 Drawing Sheets

US 8,917,465 B1

IMPLEMENTING SPIN TORQUE OSCILLATOR POWER-ON OSCILLATION CHECKER USING RAMPED STO BIAS DIFFERENTIATOR IN MICROWAVE-ASSISTED MAGNETIC RECORDING (MAMR) HARD DISK DRIVES

RELATED APPLICATION

A related application by the present assignee and inventors John Contreras, Samir Y. Garzon, and Rehan Ahmed Zakai is being filed on the same day herewith having Ser. No. 14/316,732, and entitled "IMPLEMENTING SPIN TORQUE OSCILLATOR POWER-ON OSCILLATION CHECKER USING AMPLITUDE MODULATED WRITE COIL CURRENT IN MICROWAVE-ASSISTED MAGNETIC RECORDING (MAMR) HARD DISK DRIVES".

FIELD OF THE INVENTION

The present invention relates generally to the data storage field, and more particularly, relates to a method, apparatus, and system for implementing a spin-torque oscillator (STO) power-on oscillation checker using a differentiator circuit to monitor STO resistance and ensure stable STO oscillation with microwave assisted magnetic recording (MAMR) hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

Microwave assisted magnetic recording (MAMR) heads in hard disk drives (HDDs) include spin-torque oscillator (STO) sensors. MAMR hard disk drives provide improved areal density and/or improve data error rates by producing a more precisely defined magnetic foot print, which is produced by the write head. This is accomplished by adding a source of microwave radiation near the write head. This microwave oscillator produces a magnetic field in multi-Giga Hertz frequency range. One key issue in MAMR systems is to insure that the STO is oscillating. Without oscillation, assist effect will be absent and the magnetic field foot print and thus recording quality will suffer.

A need exists for effective mechanism for implementing a spin-torque oscillator (STO) checker to monitor STO resistance and provide stable STO oscillation. It is desirable to provide such a mechanism with simple to implement circuit technique amenable to present preamp and front-end technologies for detecting the STO oscillation.

SUMMARY OF THE INVENTION

Aspects of the preferred embodiments are to provide a method, apparatus, and system for implementing a spin-torque oscillator (STO) checker to monitor STO resistance and to provide stable STO oscillation. Other important aspects of the preferred embodiments are to provide such method, apparatus, and system substantially without negative effect and to overcome some of the disadvantages of prior art arrangements.

In brief, a method, apparatus, and system are provided for implementing a power-on spin-torque oscillator (STO) oscillation checker to monitor STO resistance to identify STO oscillation with microwave assisted magnetic recording (MAMR) hard disk drives (HDDs). A changing bias current is applied to the STO in the presence of constant write drive current. The STO bias current is changed to observe sudden changes in STO resistance monitored using a differentiator circuit to identify STO oscillation, used to ensure stable MAMR HDD write operation.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the preferred embodiments, a method, apparatus, and system are provided for implementing a spin-torque oscillator (STO) checker to monitor STO resistance and ensure stable STO oscillation with microwave assisted magnetic recording (MAMR) hard disk drives (HDDs).

Figure 1:
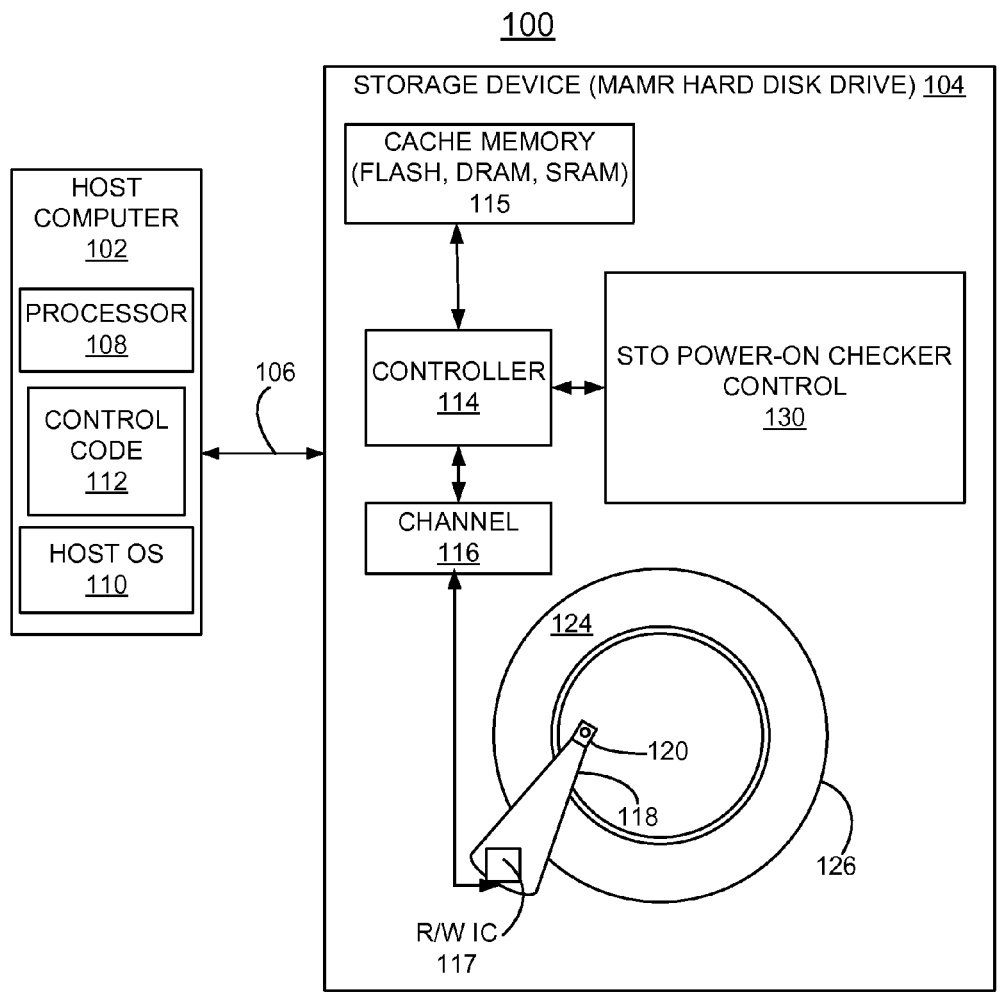
FIG. 1 is a block diagram representation illustrating a system for implementing a spin-torque oscillator (STO) oscillation checker to monitor STO resistance to identify STO oscillation with microwave assisted magnetic recording (MAMR) hard disk drives (HDDs) in accordance with preferred embodiments.

Having reference now to the drawings, in FIG. 1, there is shown an example system generally designated by the reference character 100 for implementing a spin-torque oscillator (STO) power-on checker to monitor STO resistance and provide stable STO oscillation for operation microwave assisted magnetic recording (MAMR) hard disk drives (HDDs) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or microwave assisted magnetic recording (MAMR) hard disk drive 104 includes a controller 114 coupled to a cache memory 115, for example, implemented with one or a combination of a flash memory, a dynamic random access memory (DRAM) and a static random access memory (SRAM), and coupled to a data channel 116. The storage device or hard disk drive 104 includes a Read/Write (R/W) integrated circuit (IC) 117 implementing a spin-torque oscillator (STO) oscillation checker to monitor STO resistance at power-on and provide stable STO oscillation. The storage device or hard disk drive 104 includes an arm 118 carrying a slider 120 for in accordance with preferred embodiments. The slider 120 flies over a writable disk surface 124 of a disk 126 and includes at least one STO for microwave assisted magnetic recording (MAMR), for example, integrated with the slider 120.

In accordance with features of preferred embodiments, a spin-torque oscillator (STO) oscillation checker control 130 is provided with the controller 114 to control checking STO oscillation, for example, at power-up and periodically during operation of the MAMR HDD 104, to identify STO oscillation. The STO oscillation checking procedure optionally can be performed periodically when the head is not flying or by moving the head to a reserved zone without customer data where the writer can be safely turned on.

System 100 including the host computer 102 and the MAMR HDD 104 is shown in simplified form sufficient for understanding the present embodiments. The illustrated host computer 102 together with the storage device or HDD 104 is not intended to imply architectural or functional limitations. The present invention can be used with various hardware implementations and systems and various other internal hardware devices.

In accordance with features of preferred embodiments, a spin-torque oscillator (STO) oscillation checker is provided to identify STO oscillation, used to ensure stable MAMR HDD write operation. Without STO oscillation, assist effect will be absent and the magnetic field foot print and thus recording quality will suffer.

Figure 2A:
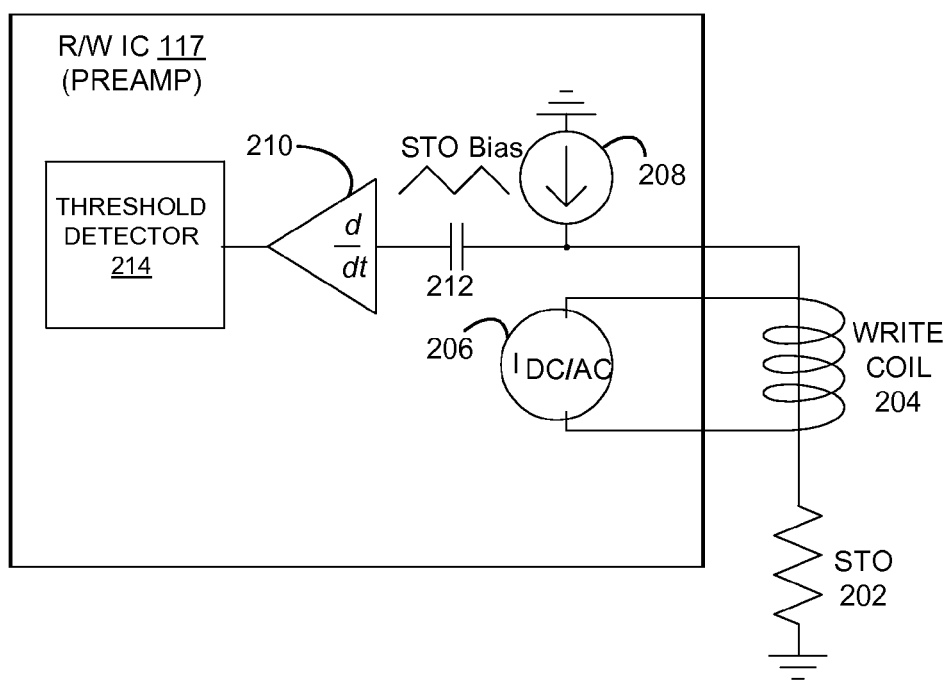
FIGS. 2A and 2B schematically illustrates a respective example circuit for implementing a spin-torque oscillator (STO) oscillation checker to monitor STO resistance to identify STO oscillation with microwave assisted magnetic recording (MAMR) hard disk drives (HDDs) in accordance with preferred embodiments.

Referring now FIG. 2A, there is shown an example spin-torque oscillator (STO) oscillation checker circuit generally designated by the reference character 200 for implementing a STO oscillation checker and is provided, for example, in the Read/Write (R/W) integrated circuit (IC) 117 or preamplifier 117. Spin-torque oscillator (STO) oscillation checker 200 effectively determines whether a spin-torque oscillator (STO) 202 is oscillating. Spin-torque oscillator (STO) oscillation checker 200 exploits the STO resistance difference between oscillating and non-oscillating states and determines if the STO is oscillating.

As shown in FIG. 2A, the STO 202 is provided with a write coil 204. STO oscillation checker 200 includes a write coil current source 206 connected to the write coil 204. A STO bias current source 208 is connected to the STO 202 and connected to a differentiator 210 via a capacitor 212. The STO bias current source 208 applies a triangular ramped or square wave bias current to the STO 202 while a constant write drive current is applied by the current source 206. STO oscillation checker 200 includes a threshold detector 214 connected to an output of the differentiator 210 used to sense an abrupt STO resistance step.

In accordance with features of the preferred embodiments, the STO bias current source 208 applies the changing bias current to the STO 202 in the presence of a constant, DC or low frequency AC write coil current applied to the write coil 204 by current source 206. The STO voltage is differentiated by differentiator 210 and the threshold detector 214 is used to sense the resulting abrupt resistance step of the STO resistance difference between oscillating and non-oscillating states of the STO and determines if the STO 202 is oscillating. STO oscillation checker 200 advantageously performs STO oscillation checking at power-on and periodically during operation of MAMR HDD 104 to identify STO oscillation.

In accordance with features of the preferred embodiments, the ramp slope of the applied ramped bias current should be small as compared with a differentiated resistance step output of the differentiator 210. This allows adequate signal-to-noise ratio in the differentiated output signal.

Figure 2B:
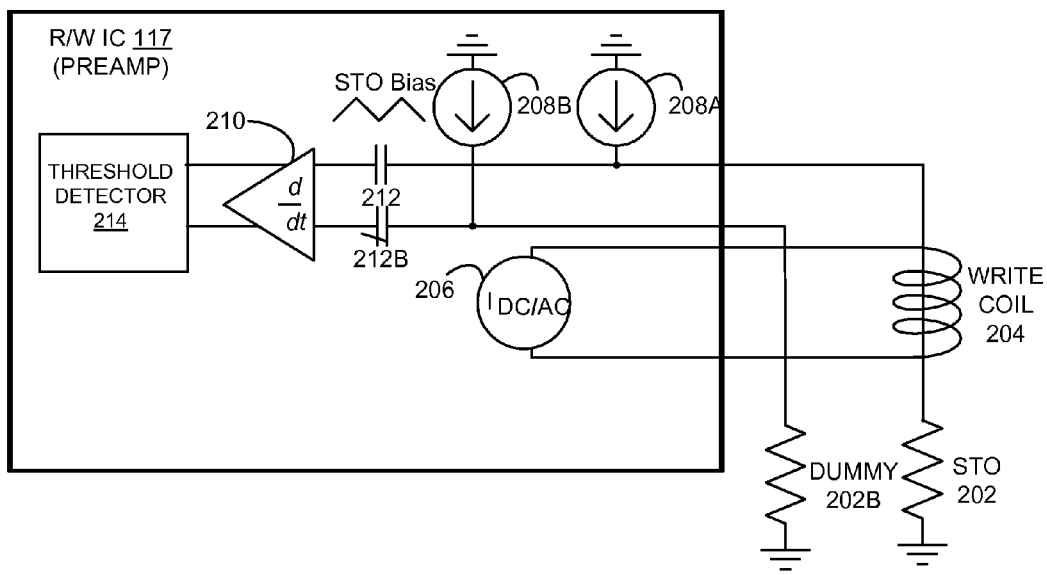

Referring now FIG. 2B, there is shown an example spin-torque oscillator (STO) oscillation checker circuit generally designated by the reference character 220 for implementing a STO oscillation checker and is provided, for example, in the Read/Write (R/W) integrated circuit (IC) 117 or preamplifier 117. Spin-torque oscillator (STO) oscillation checker 220 exploits the STO resistance difference between oscillating and non-oscillating states and determines if the STO is oscillating.

As shown in FIG. 2B, spin-torque oscillator (STO) oscillation checker 220 includes a differential architecture and effectively determines whether a spin-torque oscillator (STO) 202 is oscillating. STO oscillation checker 220 includes the STO 202 and a second STO 202B, with one oscillating, and the other not oscillating, with the STO 202 and the second STO 202B used to implement the STO oscillation checking.

As shown in FIG. 2B, STO oscillation checker 220 includes the STO 202 and the second STO 202B, with the second STO 202B not required during operation of MAMR HDD 104 and used for implementing the STO oscillation checking to identify oscillation of the STO 202. STO oscillation checker 220 includes a write coil 204 and a write coil current source 206 connected to the write coil 204. A respective STO bias current source 208A, 208B is connected to the STO 202 and the second STO 202B. Each respective STO bias current source 208A, 208B is connected to a differentiator 210B via a respective capacitor 212A, 212B. The respective STO bias current source 208A, 208B applies a triangular ramped or square wave bias current to the STO 202, STO 202B while a constant write drive current is applied by the current source 206. STO oscillation checker 220 includes a differential threshold detector 214 connected to an output of the differentiator 210B used to sense an abrupt STO resistance step.

Figure 3:
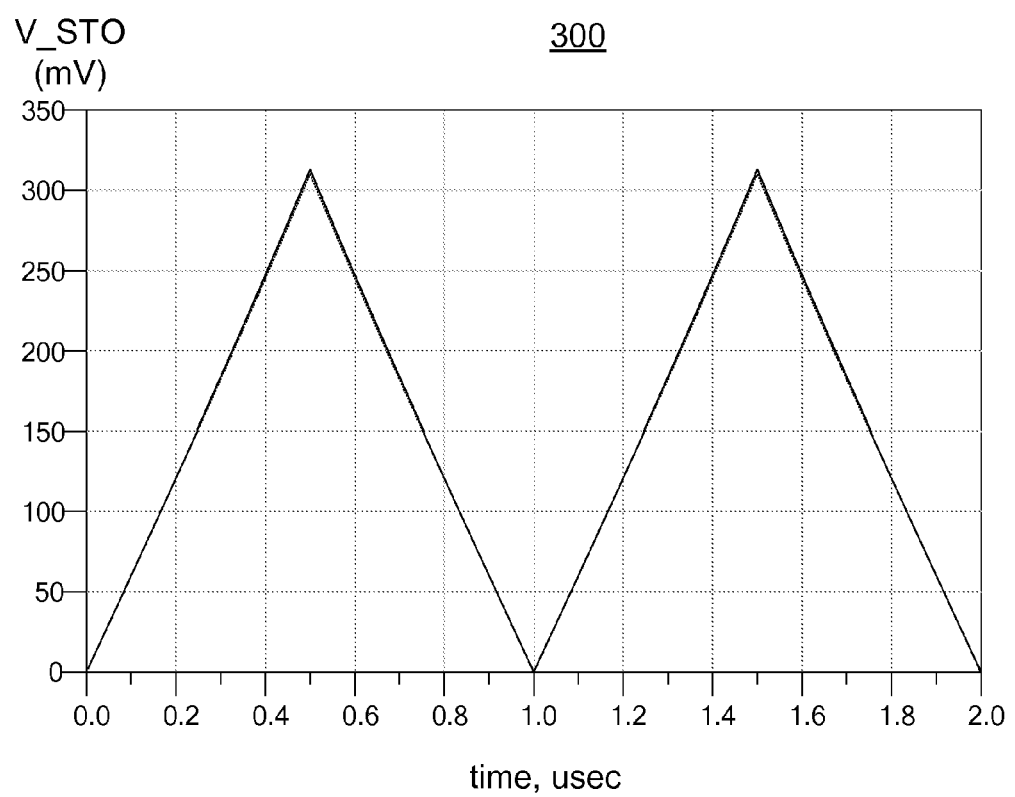
FIGS. 3, 4, and 5, are charts illustrating example waveforms of the illustrated circuit of FIG. 2 in accordance with preferred embodiments.
Figure 4:
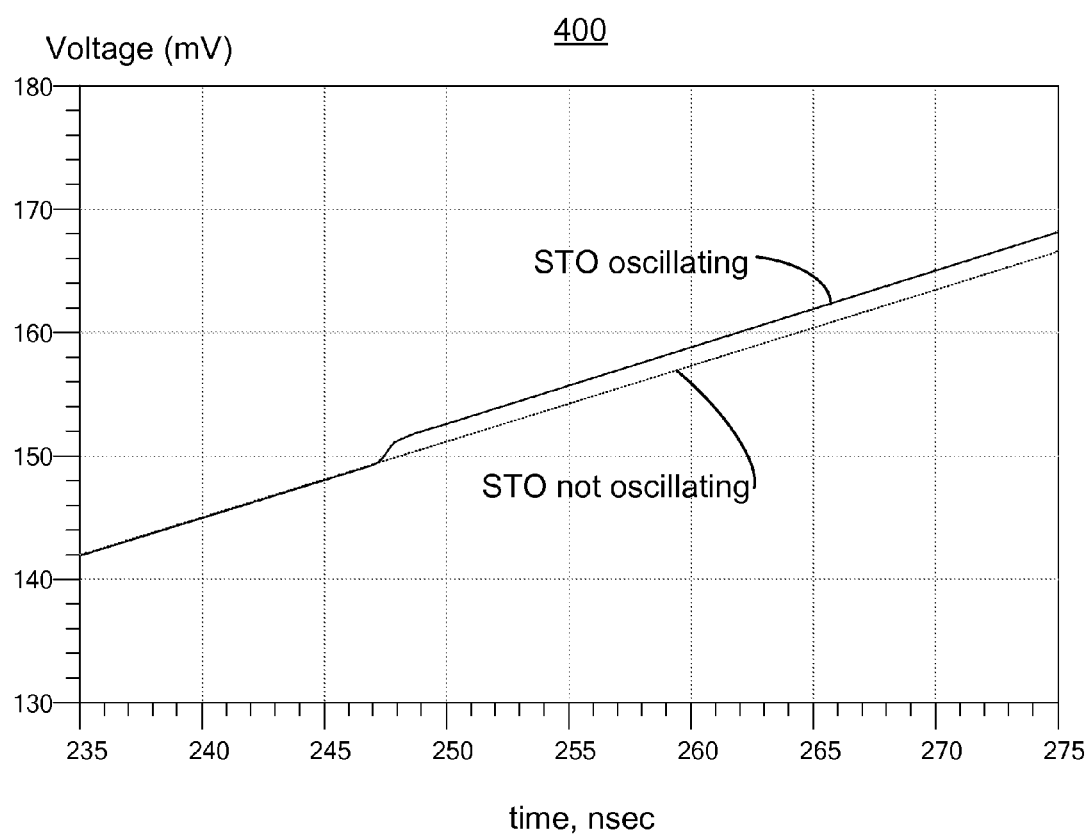
Figure 5:
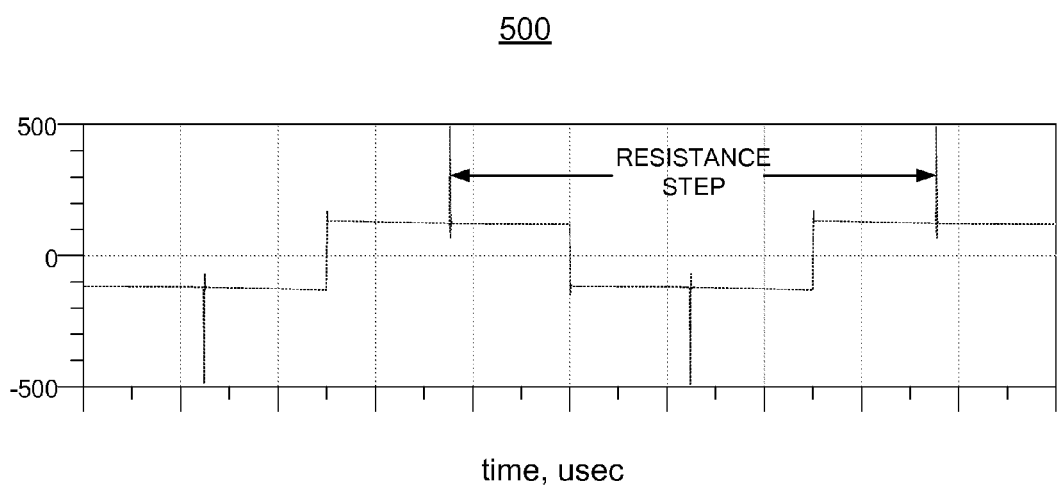

Referring to FIGS. 3, 4, and 5, there are shown typical example waveforms of the illustrated STO oscillation checker 200 in accordance with preferred embodiments.

In FIG. 3, an example waveform generally designated by the reference character 300 is shown illustrating STO voltage resulting from a ramped bias current applied by the STO bias current source 208 to the STO 202 with voltage shown with respect to the vertical axis and time shown with respect to the horizontal axis.

In FIG. 4, there are shown example waveforms generally designated by the reference character 400 illustrating STO oscillating and STO not oscillating resulting from the ramped bias current applied by the STO bias current source 208 to the STO 202 with voltage shown with respect to the vertical axis and time shown with respect to the horizontal axis.

In FIG. 5, an example waveform generally designated by the reference character 500 is shown illustrating a STO resistance step resulting from the ramped bias current applied by the STO bias current source 208 to the STO 202 with voltage shown with respect to the vertical axis and time shown with respect to the horizontal axis.

Figure 6:
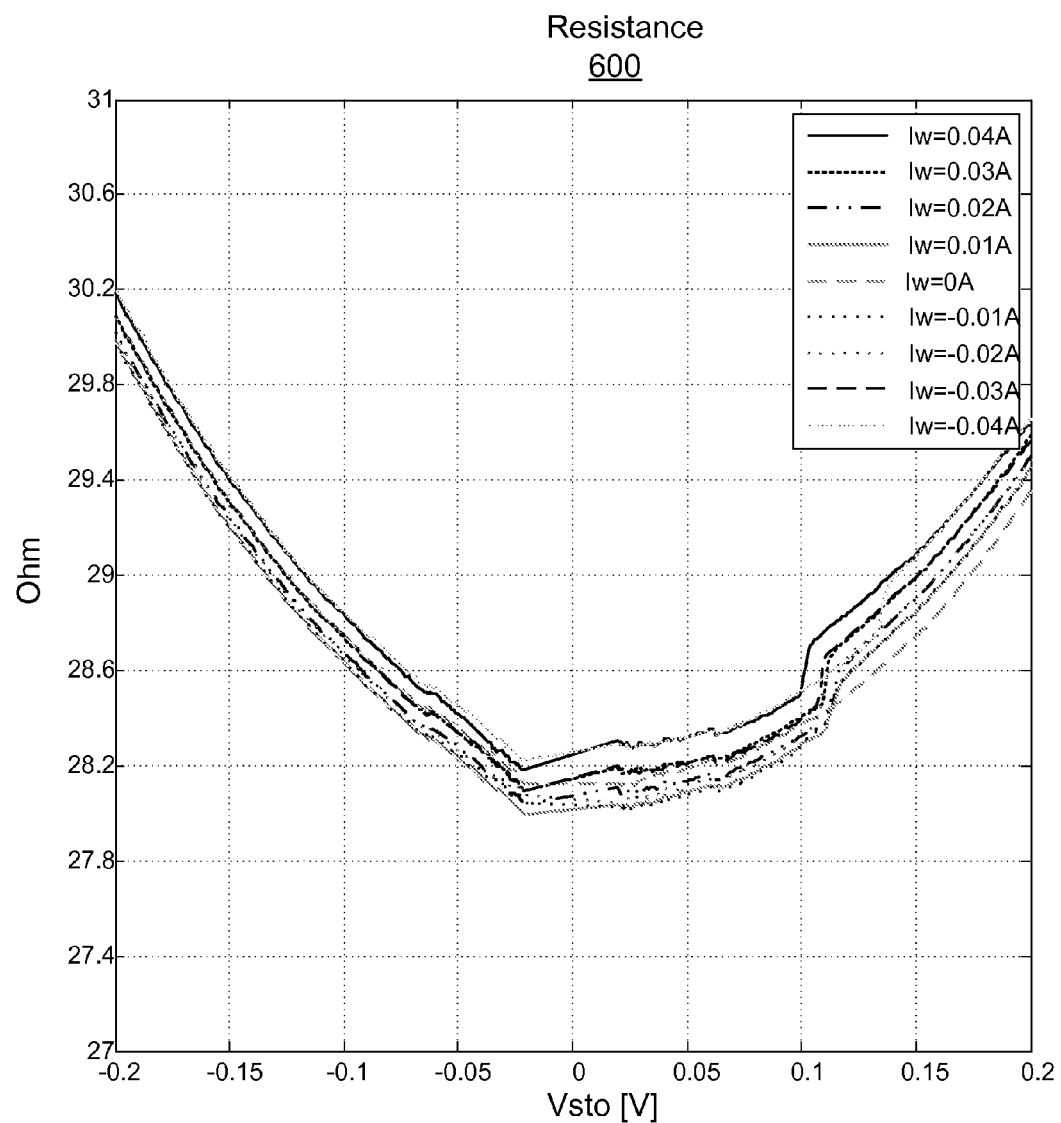
FIGS. 6, and 7 respectively illustrate example waveforms of respective example STO resistance step for positive and negative DC write current ($I_W$) in the accordance with preferred embodiments.
Figure 7:
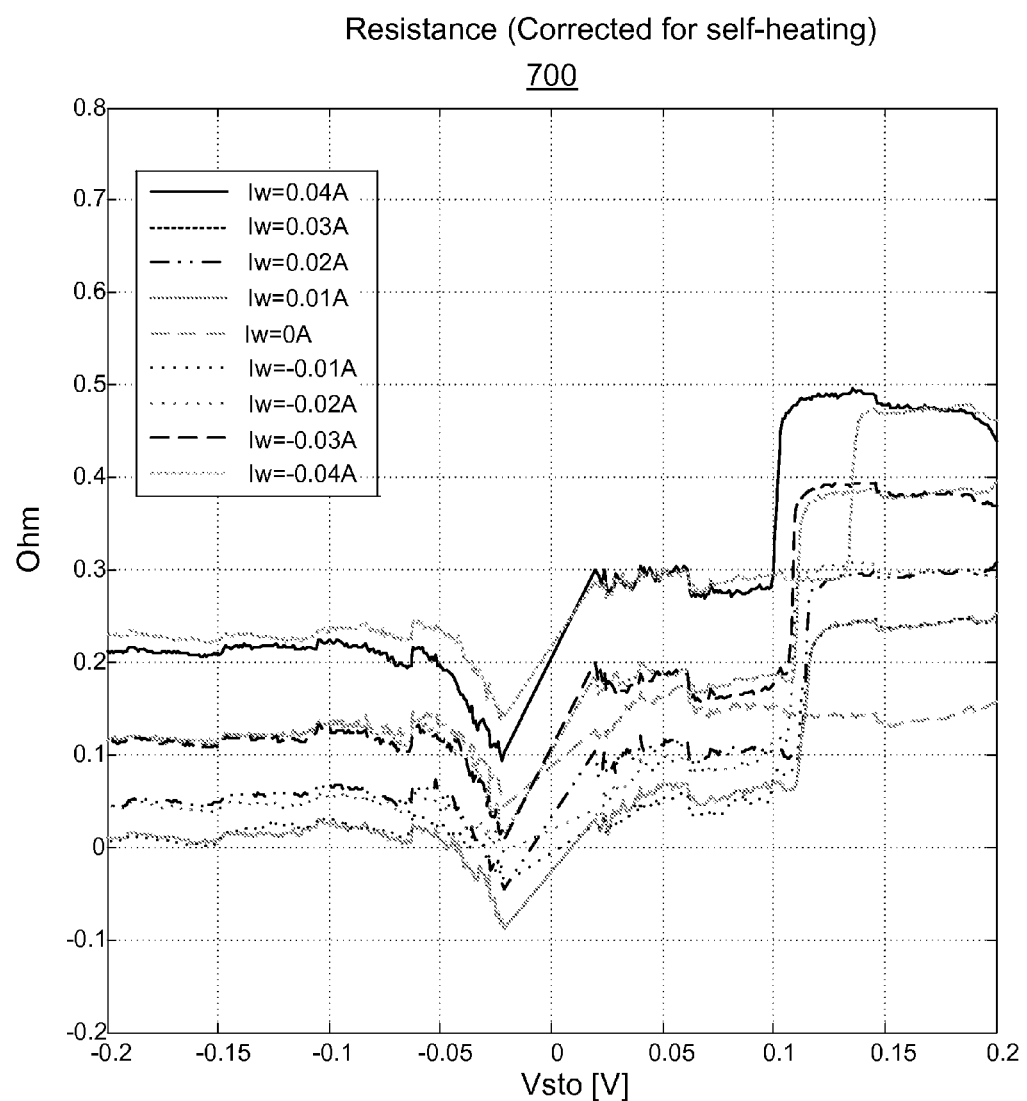

Referring also to FIGS. 6, and 7 there are shown typical example waveforms respectively generally designated by the reference characters 600, 700 of respective example STO resistance step for multiple example positive and negative DC write currents ($I_W$) in the accordance with preferred embodiments. STO resistance step is not observed for zero DC $I_W$. In FIGS. 6, and 7 resistance in ohms is shown with respect to the vertical axis and voltage STO in volts is shown with respect to the horizontal axis.

In FIG. 7, the illustrated resistance waveforms 700 are corrected for self-healing. For example, in FIG. 7, a slight step function in STO resistance occurs when the STO 202 starts oscillating around 100 mV in the range of 0.2 ohms.

It should be understood that the Spin-torque oscillator (STO) oscillation checker 200 is not limited to the illustrated triangular ramped STO bias current shown in FIG. 3, for example, a square wave STO bias current could be used. It should be understood that the Spin-torque oscillator (STO) oscillation checker 200 is not limited to the illustrated circuit arrangement, various hardware circuit devices can be used. For example, a second differentiator can be used to eliminate the steady state ramp slope after the first differentiator but this produces ambiguity in the output by adding discontinuities at time points where bias slope changes polarity.

Figure 8:
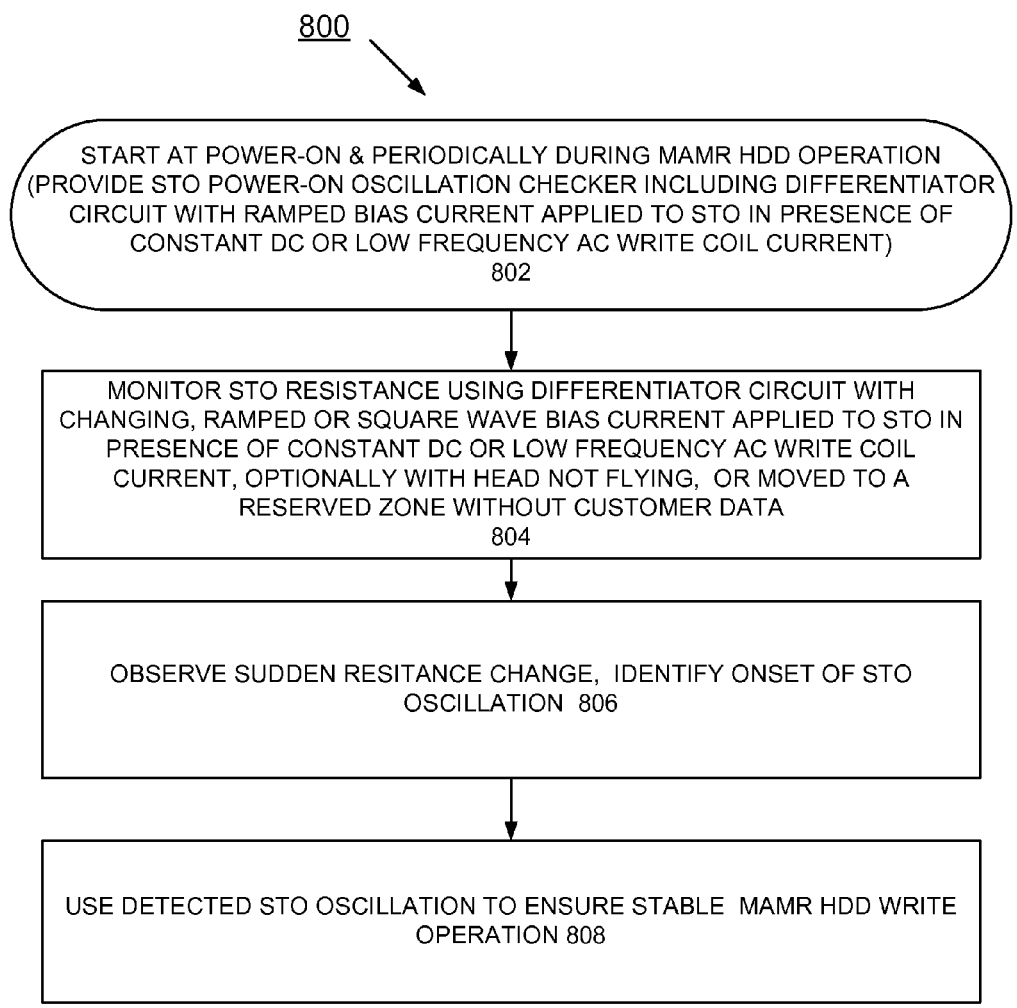
FIG. 8 is a flow chart illustrating example operations for implementing a spin-torque oscillator (STO) checker to monitor STO resistance to identify STO oscillation in MAMR HDDs in accordance with preferred embodiments.

Referring now to FIG. 8, there are shown example operations generally designated by the reference character 800 of the spin-torque oscillator (STO) oscillation checker 200 including a differentiator circuit to monitor STO resistance to identify STO oscillation with microwave assisted magnetic recording (MAMR) hard disk drives (HDDs) in the accordance with preferred embodiments starting at power-on and periodically during MAMR HDD operation at a block 802. As indicated in a block 804, STO resistance is monitored using the differentiator circuit with a changing, ramped or square wave bias current applied to the STO, and write coil drive current is constant during this operation. The STO oscillation checking at block 804 optionally is performed when the head is not flying or by moving the head to a reserved zone without customer data where the writer can be safely turned on. The STO bias current is changed to observe sudden changes in STO resistance. As indicated in a block 806, sudden STO resistance change is observed, identifying onset of STO oscillation. As indicated in a block 808, the detected STO oscillation is used to ensure stable write operation of the MAMR HDD 104.

Figure 9:
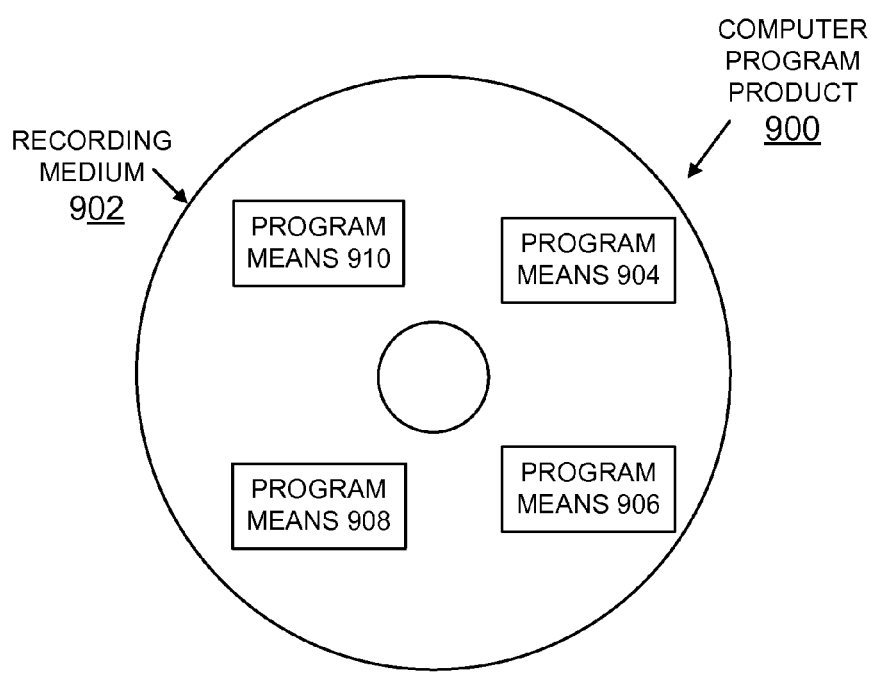
FIG. 9 is a block diagram illustrating a computer program product in accordance with preferred embodiments.

Referring now to FIG. 9, an article of manufacture or a computer program product 900 of the preferred embodiments is illustrated. The computer program product 900 includes a computer readable recording medium 902, such as, a floppy disk, a high capacity read only memory in the form of an optically read compact disk or CD-ROM, a tape, or another similar computer program product. Computer readable recording medium 902 stores program means or control code 904, 906, 908, 910 on the medium 902 for carrying out the methods for implementing the spin-torque oscillator (STO) oscillation checker 200 for MAMR hard disk drives in accordance with preferred embodiments in the system 100 of FIG. 1.

A sequence of program instructions or a logical assembly of one or more interrelated modules defined by the recorded program means or control code 904, 906, 908, 910, direct HDD controller 114 using spin-torque oscillator (STO) oscillation checker 200 in the system 100 to monitor STO resistance and ensure stable STO oscillation during MAMR HDD operation of preferred embodiments.

While the present invention has been described with reference to the details of the embodiments of the invention shown in the drawing, these details are not intended to limit the scope of the invention as claimed in the appended claims.

What is claimed is:

1. A method for implementing a spin-torque oscillator (STO) oscillation checker for microwave assisted magnetic recording (MAMR) hard disk drives (HDDs) comprising:
    applying a changing STO bias current to a spin-torque oscillator (STO);
    using a differentiator circuit coupled to the STO, monitoring STO resistance responsive to the applied changing STO bias current to identify a STO resistance change and STO oscillation; and
    using the identified STO oscillation to ensure stable MAMR HDD write operation.

2. The method as recited in claim 1 wherein applying the changing STO bias current to the spin-torque oscillator (STO) includes applying a triangular ramped bias current or a square wave bias current to the STO during a power-on operation and periodically during MAMR HDD operation.

3. The method as recited in claim 1 includes providing a write coil coupled to the STO and providing a constant write coil current source applying a constant current to the write coil.

4. The method as recited in claim 3 wherein providing a constant write coil current source applying a constant current to the write coil includes providing a constant direct current (DC) write coil drive current source.

5. The method as recited in claim 3 wherein providing a constant write coil current source applying a constant current to the write coil includes providing a constant low frequency AC write coil drive current source.

6. The method as recited in claim 1 wherein using the differentiator circuit coupled to the STO, monitoring STO resistance includes providing a threshold detector coupled to an output of the differentiator circuit.

7. An apparatus for implementing a spin-torque oscillator (STO) oscillation checker for microwave assisted magnetic recording (MAMR) hard disk drive (HDDs), comprising:
    a controller;
    at least one disk; said disk including a disk media for storing data;
    a spin-torque oscillator (STO) for microwave assisted magnetic recording (MAMR);
    the spin-torque oscillator (STO) oscillation checker comprising
        a STO bias current source applying a changing STO bias current to the spin-torque oscillator (STO);
        a differentiator circuit coupled to the STO, said differentiator circuit monitoring STO resistance responsive to the applied changing STO bias current to identify a STO resistance change and STO oscillation; and said controller using the identified STO oscillation to ensure stable MAMR HDD write operation.

8. The apparatus as recited in claim 7 includes control code stored on a non-transitory computer readable medium, and wherein said controller uses said control code to identify STO oscillation, used to ensure stable MAMR HDD write operation.

9. The apparatus as recited in claim 7 includes a Read/Write integrated circuit (IC) coupled to a slider, said slider containing said spin-torque oscillator (STO); and said spin-torque oscillator (STO) oscillation checker provided in said Read/Write integrated circuit (IC).

10. The apparatus as recited in claim 7 wherein said STO bias current source applies a triangular ramped bias current or a square wave bias current to the STO.

11. The apparatus as recited in claim 7 includes a write coil coupled to the STO and a write coil current source applying a constant write coil current to the write coil.

12. The apparatus as recited in claim 11 includes said write coil current source applying a constant DC write coil drive current to the write coil.

13. The apparatus as recited in claim 11 includes said write coil current source applying a constant low frequency AC write coil drive current to the write coil.

14. The apparatus as recited in claim 7 includes a threshold detector coupled to an output of the differentiator circuit, said threshold detector used to identify a sudden STO resistance change.

15. A system for implementing a spin-torque oscillator (STO) oscillation checker comprising:
  a microwave assisted magnetic recording (MAMR) hard disk drive (HDD), said MAMR HDD comprising a controller;
  at least one disk; said disk including a disk media for storing data;
  a spin-torque oscillator (STO) for microwave assisted magnetic recording (MAMR);
  the spin-torque oscillator (STO) oscillation checker comprising
    a STO bias current source applying a changing STO bias current to the spin-torque oscillator (STO);
    a differentiator circuit coupled to the STO, said differentiator circuit monitoring STO resistance responsive to the applied changing STO bias current to identify a STO resistance change and STO oscillation; and
  said controller using the identified STO oscillation to ensure stable MAMR HDD write operation.

16. The system as recited in claim 15 includes control code stored on a non-transitory computer readable medium, and wherein said controller uses said control code to identify STO oscillation, used to ensure stable MAMR HDD write operation.

17. The system as recited in claim 15 includes a Read/Write integrated circuit (IC) coupled to a slider, said slider containing said spin-torque oscillator (STO); and said Read/Write integrated circuit (IC) implementing the spin-torque oscillator (STO) oscillation checker.

18. The system as recited in claim 15 includes said STO bias current source applies a triangular ramped bias current or a square wave bias current to the STO.

19. The system as recited in claim 15 includes a write coil coupled to the STO and a write coil current source applying a constant DC write coil drive current or a constant low frequency AC write coil drive current to the write coil.

20. The system as recited in claim 15 includes said STO bias current source applying a triangular ramped bias current or a square wave bias current to the STO at power-on and periodically during MAMR HDD operation.

\* \* \* \* \*